United States Patent

[11] 3,633,987

[72] Inventor Robert E. Brooks
Redondo Beach, Calif.
[21] Appl. No. 41,859
[22] Filed June 1, 1970
[45] Patented Jan. 11, 1972
[73] Assignee TRW Inc.
Redondo Beach, Calif.

[54] METHOD OF AND APPARATUS FOR HOLOGRAPHICALLY CONTOUR MAPPING OF DISTANT OBJECTS
16 Claims, 1 Drawing Fig.

[52] U.S. Cl. .................................................... 350/3.5, 356/109
[51] Int. Cl. .................................................... G02b 27/22
[50] Field of Search .......................................... 350/3.5; 356/109

[56] References Cited
OTHER REFERENCES
Bobrinev et al., Radio Engineering & Electronics Physics, Vol. 13, No. 11, pp. 1,814– 1,815 (Nov. 1968)

Primary Examiner—David Schonberg
Assistant Examiner—Robert L. Sherman
Attorneys—Daniel T. Anderson, Edwin A. Oser and Jerry A. Dinardo ABSTRACT: A hologram is generated from which an image may be reconstructed of a distant object. This image has a brightness which is modulated so that areas or fringes of maximum or minimum brightness represent contours of equal range. This contour pattern is obtained when the beam of light used to record the hologram has a coherence function which is periodic with differences in path length. This periodic coherence function in turn is obtained by periodically modulating a coherent beam of radiant energy. The modulation may be either amplitude or phase modulations, the latter including frequency modulation, or a combination thereof. Since the optical path difference depends directly on the range to different points on the object, the resulting contour pattern directly reflects these differences in length. The hologram may be made by using brief pulses of the light beam, the light being pulsed by pulsing the laser, the hologram, or else the object or the reference beams.

PATENTED JAN 11 1972 3,633,987
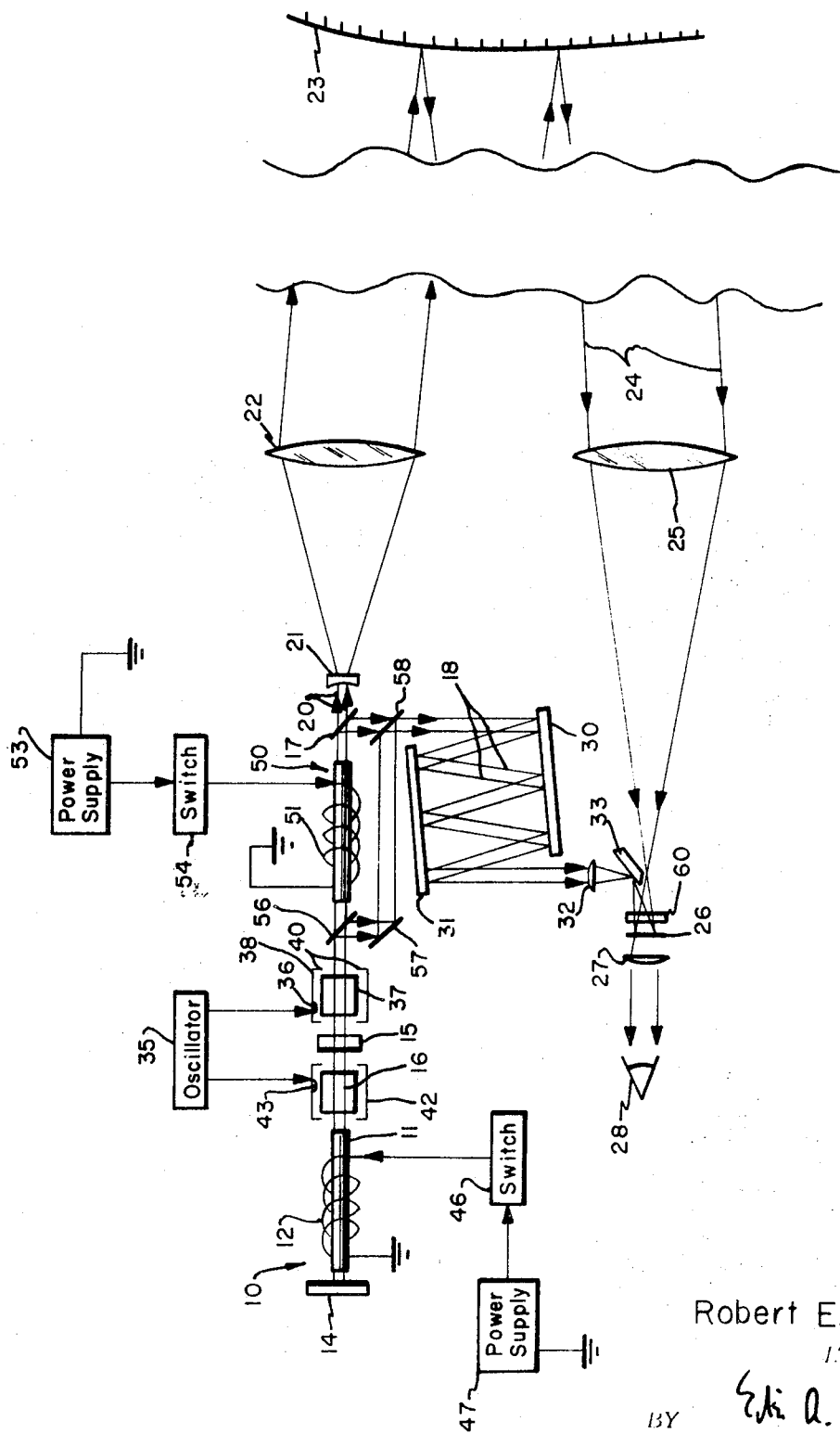
Robert E. Brooks
INVENTOR
BY Eki A. Osu.
ATTORNEY

METHOD OF AND APPARATUS FOR HOLOGRAPHICALLY CONTOUR MAPPING OF DISTANT OBJECTS

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

This invention relates generally to holography and particularly to a method of and apparatus for generating a hologram, the reconstructed image of which bears contour fringes or lines of an object.

It has been proposed in the past to prepare holograms showing a contour map of an object. Such a technique has, for example, been proposed by B. P. Hildebrand and K. A. Haines in the Journal of the Optical Society of America, Volume 57, pages 155 through 162. This has been effected by using a laser beam having two adjacent frequencies to create a contour pattern or contour fringes on a hologram. The distance between adjacent fringes is a function essentially of the difference between the two frequencies. Thus if the two frequencies are $\lambda_1$ and $\lambda_2$, the contour interval I is equal to:

$$I = \frac{\lambda_1 \lambda_2}{2(\lambda_1 - \lambda_2)} \quad (1)$$

The factor 1/2 appears because the light path is doubled by reflection from the object. Actually the coherence function in the direction of propagation will vary sinusoidally with the distance between cycles, according to formula (1).

However this technique has several disadvantages. In the first place, the coherence function varies sinusoidally. This means that the difference in light intensity between adjacent fringes also varies sinusoidally so that the fringes appear somewhat blurred. In the second place, it is usually necessary to make use of two naturally occurring frequencies of the particular laser used which, of course, determines the limits of the available contour interval.

Furthermore, it has frequently been assumed in the past that it is not possible with holography to obtain holograms of either large or distant objects. However, this is not generally true because it is not always necessary to use photographic materials with high resolution which are not very light sensitive. This may, for example, be accomplished by making the angle between the reference and the subject or scene beam where they intersect to form the hologram, very small. With such a small angle the interference fringes which create the hologram are relatively coarse and therefore it is no longer necessary to use high resolution photographic materials. This, in turn, makes it possible to use photographic material, such as films or plates which are much more sensitive to light, and hence permit shorter exposure times or require less light intensity.

It is accordingly an object of the present invention to provide a method of an apparatus for creating a contour map on a hologram of a distant object.

Another object of the present invention is to provide a holographic method and apparatus which permits to create contour fringes on the reconstructed image of a hologram within a desirable range, of say, millimeters to decimeters.

A further object of the present invention is to provide a holographic method and apparatus of the type referred to which permits to provide contour fringes which are very distinct by having a high intensity with a corresponding low intensity between adjacent fringes.

SUMMARY OF THE INVENTION

A method in accordance with the present invention serves the purpose of generating a contour map on an image reconstructed from a hologram of an object which may be a distant object. To this end a coherent beam of radiant energy is generated and thereafter modulated. This beam is then split into a reference beam and a subject or scene beam. The subject beam is reflected from an object the contours of which are to be mapped. Then the reflected subject beam and the reference beam are recombined in a predetermined plane for recording a hologram of the object.

Thus, in accordance with the present invention the coherent beam of radiant energy of the light is periodically modulated. As a result the hologram is formed with an image having brightness contours indicative of variations in distance of the object with respect to the subject beam. Or stated in other words, the contour lines correspond to differences in the time of arrival of the subject beam reflected from different parts of the object.

The coherent beam may be amplitude or phase modulated in a periodic manner. The phase modulation includes frequency modulation. Also a time modulated coherent beam will exhibit frequency sidebands. Accordingly with any such modulation sidebands are created corresponding to periodic phase modulation, and it is these sidebands which are used in accordance with the present invention.

It has been shown mathematically that the temporal coherence function of the radiation field in the direction of propagation is the Fourier transform of its power spectral density. This is only strictly true when the sidebands are symmetric with respect to the carrier frequency. This has been explained, for example, in the book by Born and Wolf, "Principles of Optics," Second Edition, published by McMillan Company, New York, 1964, pages 316 through 327. Thus there is a relationship between the coherence length of a light beam and its spectral distribution. Furthermore, it can be shown that the coherence function in the direction of propagation can be made to vary in the shape of pulses or sharp spikes which recur periodically, and each such pulse or spike will create one of the interference fringes previously referred to. The duration of the pulses and their shape is a function of the spectral wavelength distribution of the light and can accordingly be selected to cover a particular need.

Also by having more than two frequencies, the spacing between adjacent contour fringes may be varied within a range of say, a millimeter to several decimeters.

BRIEF DESCRIPTION OF THE DRAWING

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing in which the simple figure is a schematic diagram of a holographic apparatus embodying the present invention.

DESCRIPTION OF THE PREFERRED EMBODIMENT

Referring now to the drawing there is illustrated a source 10 of coherent radiation. This may, for example, consist of a laser, such as a ruby laser, having a ruby rod 11. The ruby rod 11 may be optically pumped by a flash lamp 12. An optical cavity may be formed by a pair of front surface mirrors 14 and 15 which enclose the laser 10. The operation of the laser 10 and its optical cavity 14, 15 is conventional and need not be further explained herein. The laser 10 may include the flash lamp 12 for a solid state laser or electrodes for a gaseous laser either of which need to be energized for pumping the laser.

A laser beam 16 issues from the optical cavity 14, 15 and may be split by a beam splitter 17 into a reference beam 18 and a subject or scene beam 20. The subject beam 20 may be enlarged by a negative lens 21. A positive lens 22 may serve to collimate it. Thus the two lenses 21 and 22 form a Galilean telescope to provide a collimated light beam which is subsequently reflected from the object 23, the contours of which are to be determined. The object 23 may be any suitable man-made structure, such, for example, as a radar antenna, a dam or a building, the surface shape of which is to be determined.

The object 23 may be almost any distance away from the laser 10 between feet to miles.

The reflected subject beam 24 may again be reduced in size by a positive lens 25 and may be directed toward a plane 26 where there may be disposed a suitable radiation-sensitive recording material. This may, for example, consist of a suitable photographic film or plate, of a photochromic material or the like. The hologram image may be subsequently inspected by means of the eyepiece 27 and its reconstructed image may be viewed by the eye 28.

The reference beam 18 may be reflected between a pair of mirrors 30 and 31 which are slightly inclined to each other so as to cause repeated reflections of the reference beam 18. The reference beam may then be subsequently focused by the positive lens 32 and may be reflected by the mirror 33 onto the plane 26 so as to cover the surface of the photographic film. Accordingly both the reflected scene beam 24 and the reference beam 18 are recombined at the plane 26 to form a hologram in the conventional manner. It is believed to be unnecessary to provide a further description how the hologram is formed by combining the phases of the reference beam with those of the scene beam and to record the resulting interference fringes.

Since the object 23 is assumed to be at a considerable distance, the angle between the reflected scene beam 24 and the reference beam 18 at the hologram 26 may be made very small. This, in turn, means that the fringe pattern formed at the hologram 26 may be rather coarse and this allows the use of low-resolution photographic material which has a high sensitivity.

In accordance with the present invention the laser beam 16 is periodically modulated. To this end, there may be provided a suitable oscillator 35 which may, for example, be a klystron driver, coupled by a coupling antenna 36 to a high-Q resonant cavity 38 which may, for example, contain an electro-optically active crystal 37. Among such crystals are potassium dihydrogen-phosphate (KDP). In other words, the high-Q cavity 38 and crystal 37 form a Pockels cell which is periodically modulated by the oscillator 35. The cavity 38 is provided with apertures 40 at the ends thereof to allow the laser beam to pass through the electro-optical crystal 37 whose index of refraction varies as a function of the applied electric field.

For example, if a range contour of 1 inch or 2.54 centimeters is desired the modulation frequency may be 5.9 GHz. (gigaherz). This corresponds to a wavelength of 5.1 centimeter, which is approximately 1 inch due to the factor one-half in formula (1). As pointed out before, this is due to the fact that the laser beam doubles its length upon reflection.

The periodic modulation of the laser beam effected by the oscillator 35, the cavity 38 and the crystal 37, therein will create a frequency spectrum. This frequency spectrum can be so selected in accordance with the teachings of the book by Born and Wolf to provide a desired contour spacing and a desired intensity variation of the fringes.

Instead of utilizing a ruby laser 10, it is also feasible to make use of a gas laser, such as an argon laser or helium-neon laser. In general, it might be said that a solid laser, such as a ruby laser has a higher light intensity, but a shorter coherence length. On the other hand, the gas lasers are characterized by lower light intensity and much higher coherence length.

Accordingly if the coherence length is short, the path length of the reference beam must be matched to that of the subject beam and this may be effected by means of the inclined mirrors 30, 31, causing a repeated reflection of the reference beam. However, if the coherence length should be sufficiently long the mirrors 30, 31 may be omitted.

The electro-optic modulator 38 operates because a standing electromagnetic wave is setup in the cavity. This, in turn, changes the refractive index of the crystal in a periodic fashion to cause a phase modulation of the laser beam. As a result, the reference and the scene beam are in step once during each contour interval, depending, of course, on the distance variation of the surface of the object 23, that is, on the time required for the subject beam to make one round trip between the beam splitter 17 and the hologram 26.

In general, it should be stressed that the modulator may be so arranged to modulate either the phase, (including the frequency) or the amplitude of the laser beam. This includes time modulation such as a laser beam generated by a mode-locked laser. In any case, there will be sidebands.

Thus, instead of providing a separate modulator it is also feasible to make use of the pulses naturally issued by a mode-locked laser. Again, such pulses represent a frequency spectrum which may be readily understood when it is realized that every pulse may be represented by a Fourier spectrum.

Instead of providing an electro-optic modulator 38 between the mirror 15 and the beam splitter 17, it is also feasible to provide a high-Q resonant cavity 42 within the optical cavity 14, 15. However, it should be noted that either the modulator 38 or the modulator 42 is optional and normally only one of them should be used. The advantage of providing a modulator 42 within the optical cavity is that less energy is required for modulating the laser beam. The cavity 42 may be coupled to the oscillator 35 through a coupling antenna 43.

Alternatively it is also feasible to pulse the laser itself or the laser beam issuing from the laser. This may, for example, be effected by providing a switch 46 between the power supply 47 and the flash lamp 12, as shown schematically. The power supply 47 and switch 46 may be used for energizing the flash lamp 12 or its electrodes, as the case may be of the laser. It should be noted that the pulse length of the light beam should be long compared to the time delay due to the distance to the object, that is, to the round trip time of the scene beam.

Instead of pulsing the laser 10 it is feasible to provide a laser amplifier 50 between the beam splitter 17 and the mirror 15 or modulator 38. This laser 50 may again be provided with a flash lamp 51 energized by a power supply 53 through a switch 54 to permit pulsing of the amplifier 50. In that case, the reference beam 18 is continuous, while the scene beam 20 is pulsed. The reference beam 18 may be conducted around the amplifier 50 by a beam splitter 56 disposed in the path of the laser beam 16. The light is then reflected by mirrors 57 and 58 onto the mirror 30 to cause repeated reflections by the two mirrors 30 and 31. Such an arrangement is preferred because less energy is required for the reference beam. By pulsing only the amplifier 50 less power is needed compared to that of a continuously energized amplifier. The essential point is that either the reference beam or the scene beam or both should be pulsed in case the target is moving or vibrating. Otherwise a continuous laser beam may be used.

Instead of pulsing either the laser 10 or the amplifier 50 it is also feasible to provide a shutter 60 ahead of the hologram 26 which has the same effect as pulsing either the reference or scene beams or both.

It should be stressed however, that with the holographic system of the present invention the contour map is formed solely at the reconstructed image of the hologram. No contour stripes appear at the object 23. The contour stripes or fringes are simply caused by periodic interference of reference and scene beam in accordance with their periodic temporal coherence.

Thus to summarize, the modulated laser beam 20 has a periodically varying coherence function. This is generally equivalent to the Fourier transform of its power spectral density as long as the sidebands are symmetric about the carrier frequency. The scheme may be used for long range contour mapping. Sharp contour lines may be generated. The sharpness of the lines depends on the depth of modulation of the laser beam, which is essentially the modulation factor. The contour interval is one-half of the wavelength of the modulation frequency. Thus the frequency is range dependent and a hologram is created only at specific ranges. These are the ranges which form the contour map on the reconstructed image. Pulsing of the beam is desirable so that the frequency difference between the reference beam and the subject beam does not change too much.

There has thus been disclosed a method of and apparatus for generating a contour map on the reconstructed image of a hologram of an object which may be a distant object. The contour map is generated directly on the reconstructed image. It does not appear on the object. The distance between adjacent fringes may be determined by the frequency of the modulation signal. This signal should be a periodic signal so that equally spaced contour fringes appear on the hologram. Either the reference beam or the subject beam or both may be pulsed to limit the frequency difference between reference and subject beams. The method of and apparatus of the present invention are characterized by a wide choice of available distances of adjacent contour fringes of the map. Furthermore, sharp and clear contour fringes are available with the system of the invention.

What is claimed is:

1. The method of generating a contour map of an object on a hologram, said method comprising the steps of:
  a. generating a coherent beam of radiant energy;
  b. splitting said coherent beam into a reference beam and a scene beam;
  c. reflecting said scene beam from an object, the contours of which are to be mapped;
  d. recombining said reflected scene beam and said reference beam for recording a hologram in a predetermined plane; and
  e. periodically modulating said coherent beam, whereby the hologram is formed from which an image may be reconstructed with contour lines indicative of variations in distance of the object with respect to the scene beam.

2. The method as defined in claim 1 wherein the phase of said coherent beam is periodically modulated to generate contour lines on the reconstructed image of the hologram.

3. The method as defined in claim 1 wherein the amplitude of said coherent beam is periodically modulated to generate frequency sidebands causing contour lines to appear on the reconstructed image of the hologram.

4. The method of generating a contour map of an object on a hologram comprising the steps of;
  a. generating a coherent light beam;
  b. periodically modulating the frequency of said light beam;
  c. splitting said modulated light beam into a reference beam and scene beam;
  d. reflecting said scene beam for an object to be mapped;
  e. recombining said reference beam and said reflected scene beam in a predetermined plane for recording a hologram to provide contour lines on the reconstructed image of the hologram indicative of variations in distance of the object with respect to said scene beam.

5. The method as defined in claim 4 wherein said scene beam is pulsed.

6. The method as defined in claim 4 wherein both said scene beam and said reference beam are pulsed.

7. The method as defined in claim 4 wherein said reference beam is additionally reflected so that its length approximately equals that of said scene beam at said predetermined plane to insure coherence of said reference and said scene beams.

8. Holographic apparatus for providing a hologram of an object which may be reconstructed to show a two-dimensional contour map of the object, said apparatus comprising:
  a. means for generating a coherent beam of radiant energy;
  b. means for periodically modulating said coherent beam to cause a periodical variation of the phase thereof;
  c. means for splitting said modulated beam into a scene beam and a reference beam, said scene beam being reflected by an object to be mapped;
  d. means for directing and for recombining said scene beam and said reference beam in a predetermined plane; and
  e. a radiation-sensitive recording material disposed in said plane for generating a hologram from which an image with contour lines may be reconstructed.

9. Apparatus as defined in claim 8 wherein said means for modulating said coherent beam modulates the phase thereof.

10. Apparatus as defined in claim 8 wherein said means for modulating said coherent beam modulates the amplitude thereof.

11. Apparatus for creating a hologram of an object, said hologram bearing an image having a two-dimensional contour map of said object, said apparatus comprising:
  a. a laser for generating a coherent light beam;
  b. an electro-optic modulator disposed in the path of said light beam for periodically modulating the phase of said light beam;
  c. means for splitting said modulated light beam into a reference beam and a scene beam;
  d. means for directing said scene beam onto an object and reflecting it therefrom;
  e. means for directing said reference beam to recombine it with said reflected subject beam in a predetermined plane; and
  f. a radiation-sensitive recording material disposed in said plane for recording a hologram, whereby the variation in phase of said reference and scene beams will create a hologram having a reconstructed image with contour lines corresponding to differences in the time of arrival between said reference and scene beams.

12. Apparatus as defined in claim 11 where means is provided for repeatedly reflecting said reference beam so that its path length substantially equals that of said scene beam at said plane to insure temporal coherence of said beams.

13. Apparatus as defined in claim 11 wherein means is provided for pulsing one of said reference and scene beams.

14. Apparatus as defined in claim 11 where means is provided for pulsing said laser.

15. Apparatus as defined in claim 11 wherein said laser includes an optical cavity, and wherein said electro-optical modulator is disposed in said cavity.

16. Apparatus as defined in claim 11 wherein a laser amplifier is disposed solely in the path of said scene beam before it is reflected from the object, and means associated with said laser amplifier for pulsing said laser amplifier.

* * * * *